United States Patent
Liu et al.

(10) Patent No.: US 11,736,935 B2
(45) Date of Patent: *Aug. 22, 2023

(54) DOWNLINK TRANSMISSION METHOD AND APPARATUS

(71) Applicant: Huawei Technologies Co., Ltd., Shenzhen (CN)

(72) Inventors: Yalin Liu, Munich (DE); Sainan Li, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

This patent is subject to a terminal disclaimer.

(21) Appl. No.: 17/513,603

(22) Filed: Oct. 28, 2021

(65) Prior Publication Data

US 2022/0174475 A1     Jun. 2, 2022

Related U.S. Application Data

(63) Continuation of application No. 16/286,931, filed on Feb. 27, 2019, now Pat. No. 11,197,149, which is a
(Continued)

(30) Foreign Application Priority Data

Aug. 29, 2016   (CN) .......................... 201610750612.1

(51) Int. Cl.
*H04W 8/24*      (2009.01)
*H04L 1/00*      (2006.01)
(Continued)

(52) U.S. Cl.
CPC ................. *H04W 8/24* (2013.01); *H04L 1/00* (2013.01); *H04L 1/0003* (2013.01);
(Continued)

(58) Field of Classification Search
CPC ..... H04W 8/24; H04W 68/005; H04W 72/04; H04W 72/042; H04W 76/27;
(Continued)

(56) References Cited

U.S. PATENT DOCUMENTS

| 8,830,884 B2 | 9/2014 | Kitazoe et al. |
| 9,750,001 B2 | 8/2017 | Feng et al. |

(Continued)

FOREIGN PATENT DOCUMENTS

| CN | 101729268 A | 6/2010 |
| CN | 102035632 A | 4/2011 |

(Continued)

OTHER PUBLICATIONS

"Discussion on Multiple Access for New Radio Systems," Agenda Item: 8.1.4.2, Source: Interdigital Communications, Document for: Discussion, 3GPP TSG-RAN WG1 Meeting #84bis, R1-162922, Busan, Korea, Apr. 11-15, 2016, 4 pages.

(Continued)

*Primary Examiner* — Minh Trang T Nguyen
(74) *Attorney, Agent, or Firm* — Slater Matsil, LLP

(57) ABSTRACT

A downlink transmission method and an apparatus, the method including sending, by a network side device, a signaling indication to a terminal device (UE), where the signaling indication carries allocation information, and where the allocation information indicates a plurality of downlink transmission resources used to transmit data blocks.

20 Claims, 4 Drawing Sheets

Related U.S. Application Data continuation of application No. PCT/CN2017/093749, filed on Jul. 20, 2017.

(51) Int. Cl.
| | | |
|---|---|---|
| *H04W 72/04* | (2023.01) | |
| *H04L 5/00* | (2006.01) | |
| *H04W 72/23* | (2023.01) | |
| *H04W 76/27* | (2018.01) | |
| *H04W 68/00* | (2009.01) | |

(52) U.S. Cl.
CPC ......... *H04L 5/0094* (2013.01); *H04W 68/005* (2013.01); *H04W 72/04* (2013.01); *H04W 72/23* (2023.01); *H04W 76/27* (2018.02); *H04L 5/0005* (2013.01); *H04L 5/0044* (2013.01); *H04L 5/0053* (2013.01); *H04L 5/0055* (2013.01)

(58) Field of Classification Search
CPC ............ H04W 72/048; H04W 72/1273; H04W 72/1289; H04L 1/00; H04L 1/0003; H04L 5/0094; H04L 5/0005; H04L 5/0044; H04L 5/0053; H04L 5/0055

See application file for complete search history.

(56) References Cited

U.S. PATENT DOCUMENTS

| | | | |
|---|---|---|---|
| 11,197,149 B2 * | 12/2021 | Liu | ........................ H04W 8/24 |
| 2011/0141952 A1 | 6/2011 | Wang et al. | |
| 2013/0223485 A1 | 8/2013 | Bai et al. | |
| 2014/0241262 A1 | 8/2014 | Novak et al. | |
| 2015/0341960 A1 | 11/2015 | Quan et al. | |
| 2016/0143008 A1 | 5/2016 | Lee et al. | |
| 2016/0205681 A1 | 7/2016 | Kim et al. | |
| 2016/0286546 A1 | 9/2016 | Koyanagi et al. | |
| 2016/0301493 A1 | 10/2016 | Cao et al. | |
| 2018/0041857 A1 | 2/2018 | Ouchi et al. | |
| 2018/0205534 A1 | 7/2018 | Yi | |
| 2018/0270854 A1 | 9/2018 | Lee et al. | |
| 2018/0375636 A1 | 12/2018 | You et al. | |
| 2019/0037640 A1 | 1/2019 | Xiong et al. | |
| 2019/0116586 A1 | 4/2019 | Basu Mallick et al. | |
| 2019/0141719 A1 | 5/2019 | Van Phan et al. | |

FOREIGN PATENT DOCUMENTS

| | | |
|---|---|---|
| CN | 102067661 A | 5/2011 |
| CN | 102124774 A | 7/2011 |
| CN | 102160319 A | 8/2011 |
| CN | 102625456 A | 8/2012 |
| CN | 102648598 A | 8/2012 |
| CN | 103298117 A | 9/2013 |
| CN | 103684677 A | 3/2014 |
| CN | 104104467 A | 10/2014 |
| CN | 104243108 A | 12/2014 |
| EP | 2291024 A1 | 3/2011 |
| EP | 2947802 A1 | 11/2015 |
| IN | 201637020481 A | 8/2016 |
| WO | 2014061998 A1 | 4/2014 |
| WO | 2014121489 A1 | 8/2014 |
| WO | 2015089296 A1 | 6/2015 |

OTHER PUBLICATIONS

"Discussion on User Plane Latency Requirements," Agenda item: 9.2.2, Source: Deutsche Telekom, Document for: Discussion & Decision, RP-160245, 3GPP TSG RAN#71, Gothenburg, Sweden, Mar. 7-10, 2016, 2 pages.

"Characteristics for URLLC," Agenda Item: 10.1.2, Source: Ericsson, Document for: Discussion, Decision, Tdoc R3-161289, 3GPP TSG-RAN WG3 #92, Nanjing, P.R. China, May 23-27, 2016, 5 pages.

* cited by examiner ical Field

Embodiments of the present invention relate to the field of communications technologies, and in particular, to a downlink transmission method and an apparatus.

BACKGROUND

As mobile terminals increase and user service types are diversified, mobile data traffic is going to explode, and a total quantity of devices that are connected to mobile communications network is expected to hit 100 billion in the world in the future. It is predicted that a quantity of mobile terminals (excluding devices of the Internet of Things) will exceed 10 billion by 2020 in the world and exceed 2 billion in China. A quantity of devices that are connected to the Internet of Things in the world will also increase rapidly. The quantity of devices that are connected to the Internet of Things will be nearly 100 billion in the world and will exceed 20 billion in China. Varied service types have greatly different network requirements, for example, an Internet of vehicles service requires an end-to-end latency of 1 ms. In a multi-connection scenario of the Internet of Things, transmission data volume of a single sensor is very low. However, there is a very high requirement on an overall quantity of connections. For another example, three dimensional (3D) holographic imaging requires a bandwidth of x Gbps (1000 megabytes per second). General requirements include reliable and latency-insensitive transmission, or low-latency and high-reliable transmission.

A service with reliable and latency-insensitive transmission can be relatively easily processed. However, for a type of service with low-latency and high-reliable transmission, for example, a vehicle-to-vehicle (V2V) service, a transmission latency and reliability are required. If transmission is unreliable, retransmission is caused, and this brings a very high transmission latency, and therefore, a requirement cannot be met. Because there are a large quantity of connections, a future radio communications system is greatly different from a current communications system. The large quantity of connections means that more resources need to be consumed for access of the terminal device and that more resources need to be consumed for transmitting scheduling signaling related to data transmission of the terminal device.

To resolve the foregoing problem, a grant-free transmission (grant-free) solution is proposed in the prior art to reduce transmission latency. A specific implementation solution is as follows. A network device pre-allocates a plurality of transmission resources for a terminal device, and notifies the terminal device of the plurality of transmission resources. When needing to transmit uplink data, the terminal device selects at least one transmission resource from the plurality of transmission resources that are pre-allocated by the network device, and the terminal device does not need to request an uplink transmission resource by using signaling each time, thereby reducing signaling overheads and reducing transmission latency.

In grant-free transmission, there are a plurality of reliable uplink transmission solutions, including duplicate transmission in time domain, frequency domain, and space domain. The main purpose is to ensure reliable transmission over an air interface. However, for grant-free downlink transmission, when downlink data arrives, a user is generally notified through paging, and then the user receives data at a specified location. However, for connected mode transmission, downlink data is mainly scheduled by using a physical downlink control channel (PDCCH). However, currently, scheduling is generally performed once, and retransmission is performed if an error occurs. Therefore, for ultra-reliable and low-latency communications (URLLC) transmission, a latency requirement cannot be met.

SUMMARY

Embodiments of the present invention provide a downlink transmission method and an apparatus, so as to resolve a problem that a downlink transmission manner in the prior art cannot meet a latency requirement of ultra-reliable and low-latency communications.

According to a first aspect, a downlink transmission method is provided, including sending, by a network side device, a signaling indication to a terminal device UE, where the signaling indication carries allocation information, and the allocation information is used to indicate a plurality of downlink transmission resources used to transmit data blocks.

According to the method disclosed in this embodiment of the present invention, when downlink data is transmitted, a plurality of transmission resources are specified to transmit the data blocks at the same time, and the plurality of transmission resources are indicated to the terminal device by using a signaling indication, the terminal device receives the data blocks on the specified plurality of transmission resources based on the signaling indication, and after receiving the data blocks, the terminal device may combine signal gains, so as to improve transmission bit error performance and meet the requirements for reliable transmission and a low latency.

In a possible implementation, before the sending, by a network side device, a signaling indication to a terminal device (user equipment, UE), the method further includes obtaining transmission capability information of the UE, where the transmission capability information is used to indicate whether the UE supports ultra-reliable and low-latency communications URLLC transmission, and determining, by the network side device based on the transmission capability information, whether to send the signaling indication to the UE.

In a possible implementation, the obtaining transmission capability information of the UE includes obtaining, by the network side device, the transmission capability information of the UE from a message that is sent by the UE in a random access process, or obtaining, by the network side device, the transmission capability information of the UE from radio resource control (RRC) signaling.

In a possible implementation, the sending, by a network side device, a signaling indication to a terminal device UE includes sending, by the network side device, the signaling indication to the UE by using one or a combination of a plurality of the following downlink signaling, including a physical downlink control channel (PDCCH), paging signaling, or the RRC signaling.

In a possible implementation, the allocation information includes a time-frequency interval between the plurality of downlink transmission resources, a quantity of resource blocks corresponding to the plurality of downlink transmission resources, and a time-frequency location of a reference resource block in the resource blocks.

In a possible implementation, the allocation information includes time-frequency locations of the plurality of downlink transmission resources.

In a possible implementation, the allocation information includes the time-frequency location of the reference resource block in the resource blocks corresponding to the plurality of downlink transmission resources, and the corresponding UE determines the downlink transmission resource based on the time-frequency location of the reference resource block, the preconfigured time-frequency interval between the downlink transmission resources, and the quantity of resource blocks.

In a possible implementation, before the sending, by a network side device, a signaling indication to a terminal device UE, the method further includes predefining, by the network side device and the UE, the time-frequency interval between the downlink transmission resources and the quantity of resource blocks by using a protocol, or determining the time-frequency interval between the downlink transmission resources and the quantity of resource blocks when the terminal device accesses the network side device.

In a possible implementation, data blocks that are transmitted on the plurality of resource blocks are completely consistent.

In a possible implementation, a plurality of resource blocks are used to transmit different redundancy versions of a same data block.

In a possible implementation, sizes of resource blocks in the plurality of resource blocks are different.

In a possible implementation, coding and modulation schemes of resource blocks in the plurality of resource blocks are different.

According to a second aspect, a downlink data receiving method is provided, including: receiving, by a terminal device UE, a signaling indication that is sent by a network side device, where the signaling indication carries allocation information, and the allocation information is used to indicate a plurality of downlink transmission resources used to transmit data blocks, and receiving, by the UE, the data blocks on the plurality of downlink transmission resources based on the allocation information.

In a possible implementation, before the receiving, by a terminal device UE, a signaling indication that is sent by a network side device, the method further includes sending, by the UE, transmission capability information of the UE to the network side device, so that the network side device determines, based on the transmission capability information, whether to send the signaling indication to the UE, where the transmission capability information is used to indicate whether the UE supports ultra-reliable and low-latency communications URLLC transmission.

In a possible implementation, the sending, by the UE, transmission capability information of the UE to the network side device includes carrying, by using a message that is sent by the UE in a random access process, the transmission capability information, or carrying, by the UE, the transmission capability information in RRC signaling.

In a possible implementation, the receiving, by a terminal device UE, a signaling indication that is sent by a network side device includes receiving, by the UE, the signaling indication from the following downlink signaling, including a physical downlink control channel (PDCCH), paging signaling, or the RRC signaling.

In a possible implementation, the allocation information includes a time-frequency interval between the plurality of downlink transmission resources, a quantity of resource blocks corresponding to the plurality of downlink transmission resources, and a time-frequency location of a reference resource block in the resource blocks.

In a possible implementation, the allocation information includes time-frequency locations of the plurality of downlink transmission resources.

In a possible implementation, the allocation information includes the time-frequency location of the reference resource block in the resource blocks corresponding to the plurality of downlink transmission resources, and before the receiving, by the UE, the data blocks on the plurality of downlink transmission resources based on the allocation information, the method further includes determining, by the UE, the plurality of downlink transmission resources based on the time-frequency location of the reference resource block, the preconfigured time-frequency interval between the downlink transmission resources, and the quantity of resource blocks.

In a possible implementation, before the receiving, by a terminal device UE, a signaling indication that is sent by a network side device, the method further includes predefining, by the UE and the network side device, the time-frequency interval between the downlink transmission resources and the quantity of resource blocks by using a protocol, or determining the time-frequency interval between the downlink transmission resources and the quantity of resource blocks when the UE connects to the network side device.

In a possible implementation, data blocks that are transmitted on the plurality of resource blocks are completely consistent.

In a possible implementation, a plurality of resource blocks are used to transmit different redundancy versions of a same data block.

In a possible implementation, sizes of resource blocks in the plurality of resource blocks are different.

In a possible implementation, coding and modulation schemes of resource blocks in the plurality of resource blocks are different.

According to a third aspect, a network side device is provided, including a processor, configured to generate a signaling indication, where the signaling indication carries allocation information, and the allocation information is used to indicate a plurality of downlink transmission resources used to transmit data blocks, and a transceiver, configured to send the signaling indication to a terminal device UE.

In a possible implementation, the processor is further configured to obtain transmission capability information of the UE, and determine, based on the transmission capability information, whether to send the signaling indication to the UE, where the transmission capability information is used to indicate whether the UE supports ultra-reliable and low-latency communications URLLC transmission.

In a possible implementation, the processor is specifically configured to obtain the transmission capability information of the UE from a message that is sent by the UE in a random access process, or obtain the transmission capability information of the UE from RRC signaling.

In a possible implementation, the transceiver is configured to send the signaling indication to the UE by using one or a combination of a plurality of the following downlink signaling a physical downlink control channel (PDCCH), paging signaling, or the RRC signaling.

In a possible implementation, the processor is configured to add a time-frequency interval between the plurality of downlink transmission resources, a quantity of resource blocks corresponding to the plurality of downlink transmission resources, and a time-frequency location of a reference resource block in the resource blocks to the signaling indication as the allocation information.

In a possible implementation, the processor is configured to add time-frequency locations of the plurality of downlink transmission resources to the signaling indication as the allocation information.

In a possible implementation, the processor is configured to add the time-frequency location of the reference resource block in the resource blocks corresponding to the plurality of downlink transmission resources to the signaling indication as the allocation information, and the corresponding UE determines the downlink transmission resource based on the time-frequency location of the reference resource block, the preconfigured time-frequency interval between the downlink transmission resources, and the quantity of resource blocks.

In a possible implementation, the processor is further configured to predefine, with the UE, the time-frequency interval between the downlink transmission resources and the quantity of resource blocks by using a protocol, or determine the time-frequency interval between the downlink transmission resources and the quantity of resource blocks when the terminal device accesses the network side device.

In a possible implementation, data blocks that are transmitted on the plurality of resource blocks are completely consistent.

In a possible implementation, a plurality of resource blocks are used to transmit different redundancy versions of a same data block.

In a possible implementation, sizes of resource blocks in the plurality of resource blocks are different.

In a possible implementation, coding and modulation schemes of resource blocks in the plurality of resource blocks are different.

According to a fourth aspect, a terminal device is provided, including a receiver, configured to receive a signaling indication that is sent by a network side device, where the signaling indication carries allocation information, and the allocation information is used to indicate a plurality of downlink transmission resources used to transmit data blocks, and a processor, configured to determine the plurality of downlink transmission resources based on the allocation information, and control the receiver to receive the data blocks on the plurality of downlink transmission resources.

In a possible implementation, the terminal device further includes a transmitter, configured to send transmission capability information of the UE to the network side device, so that the network side device determines, based on the transmission capability information, whether to send the signaling indication to the UE, where the transmission capability information is used to indicate whether the UE supports ultra-reliable and low-latency communications URLLC transmission.

In a possible implementation, the transmitter is specifically configured to carry the transmission capability information in a message that is sent in a random access process, or carry the transmission capability information in RRC signaling.

In a possible implementation, the receiver is specifically configured to receive the signaling indication from the following downlink signaling, including a physical downlink control channel (PDCCH), paging signaling, or the RRC signaling.

In a possible implementation, the processor is specifically configured to determine the plurality of downlink transmission resources based on a time-frequency interval between the plurality of downlink transmission resources, a quantity of resource blocks corresponding to the plurality of downlink transmission resources, and a time-frequency location of a reference resource block in the resource blocks that are in the allocation information.

In a possible implementation, the processor is specifically configured to determine the plurality of downlink transmission resources based on time-frequency locations of the plurality of downlink transmission resources in the allocation information.

In a possible implementation, the processor is specifically configured to determine the plurality of downlink transmission resources based on the time-frequency location of the reference resource block in the resource blocks corresponding to the plurality of downlink transmission resource, the preconfigured time-frequency interval between the downlink transmission resources, and the quantity of resource blocks that are in the allocation information.

In a possible implementation, the processor is further configured to predefine, with the network side device, the time-frequency interval between the downlink transmission resources and the quantity of resource blocks by using a protocol, or determine the time-frequency interval between the downlink transmission resources and the quantity of resource blocks when the terminal device connects to the network side device.

In a possible implementation, data blocks that are transmitted on the plurality of resource blocks are completely consistent.

In a possible implementation, a plurality of resource blocks are used to transmit different redundancy versions of a same data block.

In a possible implementation, sizes of resource blocks in the plurality of resource blocks are different.

In a possible implementation, coding and modulation schemes of resource blocks in the plurality of resource blocks are different.

According to a fifth aspect, a computer-readable storage medium is provided, including an instruction, where when the instruction runs on a computer, the computer is enabled to perform the method according to any one of the possible implementations of the first aspect and the second aspect.

Embodiments of the present invention provide a downlink transmission method and an apparatus. When downlink data is transmitted, a plurality of transmission resources are specified to transmit the data blocks at the same time, and the plurality of transmission resources may be in a relationship of time division, frequency division, or space division. The plurality of transmission resources are indicated to the terminal device by using the signaling indication, the terminal device receives the data blocks on the specified plurality of transmission resources based on the signaling indication, and after receiving the data blocks, the terminal device may combine signal gains, thereby improving transmission bit error performance.

DETAILED DESCRIPTION OF ILLUSTRATIVE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Embodiments of the present invention provide a downlink transmission method. When downlink data is transmitted, a plurality of transmission resources are specified to transmit data blocks at the same time, and the plurality of transmission resources may be in a relationship of time division, frequency division, or space division. The plurality of transmission resources are indicated to a terminal device by using a signaling indication, the terminal device receives the data blocks on the specified plurality of transmission resources based on the signaling indication, and after receiving the data blocks, the terminal device may combine signal gains, thereby improving transmission bit error performance. The following further describes the solutions provided in the embodiments of the present invention in detail with reference to specific implementations.

Embodiment 1

Figure 1:
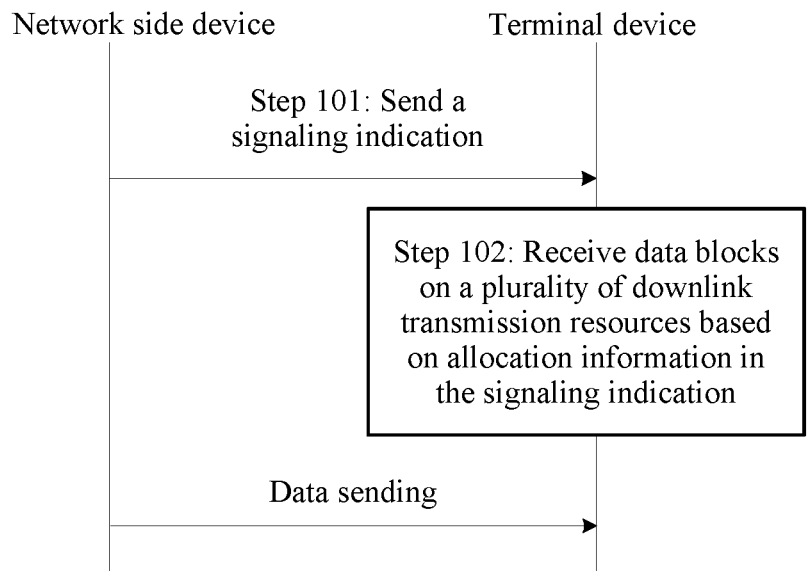
FIG. 1 is a schematic flowchart of a downlink transmission method according to an embodiment of the present invention.

As shown in FIG. 1, an embodiment of the present invention provides a downlink transmission method, and the method specifically includes the following steps.

Step 101: A network side device sends a signaling indication to a terminal device (User Equipment, UE), where the signaling indication carries allocation information, and the allocation information is used to indicate a plurality of downlink transmission resources used to transmit data blocks.

In this embodiment, the plurality of downlink transmission resources are corresponding to a plurality of resource blocks that are formed through time division, frequency division, or space division. The data blocks that are transmitted on the plurality of resource blocks may be completely consistent, or may be different redundancy versions that are obtained after channel coding is performed on a same data block, and version numbers of these different versions may be notified in real time or may be predetermined. The different redundancy versions do not need to include completely same content, on the contrary, the different redundancy versions will be a set of different coded bits, and each set of coded bits represents information bits of a same data set. Because a redundancy version of the same data block may include an additional check bit that is not included in another redundancy version, in this embodiment, when the plurality of resource blocks are used to transmit different redundancy versions of the same data block, sizes of resource blocks in the plurality of resource blocks may be different. Correspondingly, different modulation and coding schemes (MCS) may also be used in the plurality of transmission resource blocks.

Optionally, based on an MCS corresponding to the resource block, the signaling indication may further include one or more MCSs. In this embodiment, the UE and the network side device may predefine and number several dedicated MCSs of URLLC transmission by using a protocol. In the dedicated MCSs of the URLLC, a manner with a lower bit rate and lower-order modulation is used to ensure more reliable transmission.

Step 102: The terminal device UE receives the signaling indication that is sent by the network side device, and receives the data blocks on the plurality of downlink transmission resources based on the allocation information.

Figure 2:
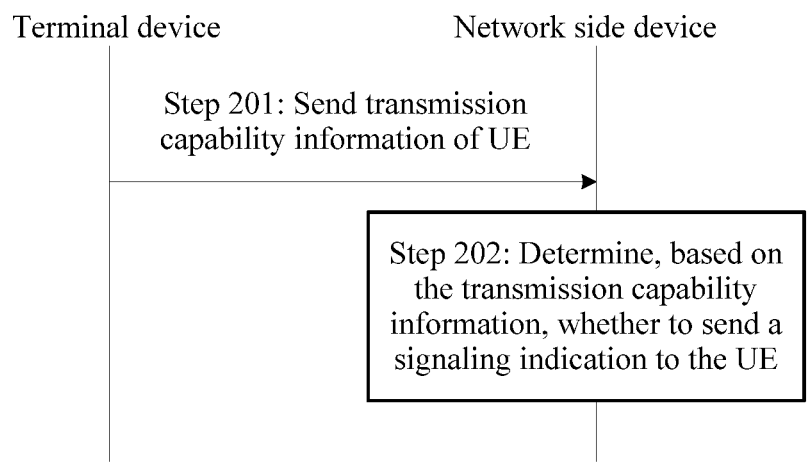
FIG. 2 is a schematic flowchart of a method for transmitting transmission capability information of UE according to an embodiment of the present invention.

In this embodiment of the present invention, the network side device determines, based on whether the terminal device supports the URLLC transmission, whether to send the signaling indication to the UE. A manner in which the network side device interacts with the terminal to determine whether the terminal supports the URLLC may be shown in FIG. 2.

Step 201: The UE sends transmission capability information of the UE to the network side device, where the transmission capability information is used to indicate whether the UE supports URLLC transmission.

When sending the transmission capability information, the UE may further send service information of the UE, channel state information of the UE, mobility of the UE, and the like.

Step 202: The network side device obtains transmission capability information of the UE, and the network side device determines, based on the transmission capability information, whether to send the signaling indication to the UE.

The network side device determines, based on capability of the UE, a current service, and a current status of the UE, whether to use a downlink transmission manner of the URLLC, selects the one or more MCSs from the dedicated MCSs of URLLC, performs MCS reconfiguration on the UE, and sends a number of the MCS to the UE, so as to transmit the current service by using the MCS.

In this embodiment, the UE and the terminal device may exchange the transmission capability information in the following manner, which may include carrying, by using a message that is sent by the UE in a random access process, the transmission capability information in, or carrying, by the UE, the transmission capability information in radio resource control (RRC) signaling.

Optionally, allocation of the downlink transmission resources includes a time-frequency location or time-frequency locations of one or more scheduled resource blocks that are invoked, and allocation of the resource blocks may also be determined by using a correspondence between the resource blocks. For example, a relative time-frequency location between the resource blocks is specified, that is, a location error between the resource blocks in time domain and frequency domain, and a quantity of the scheduled resource blocks, and the resource location error and the quantity of resource blocks may be preset, for example, the RRC may be used to perform preconfiguration, and the network device and the UE maintain the configuration information consistent at the same time, or the configuration information may be notified to a user in real time through dynamic scheduling, or may be defined by default by using a protocol, or may be determined when the UE accesses the network device. Specifically, the signaling indication may be carried by using the following downlink signaling, including a PDCCH used to carry scheduling information and other downlink control information (a transmission format, resource allocation, uplink scheduling permission, power control, uplink retransmission information, and the like), a paging signal, or the RRC signaling used to process third layer information of a control plane between the UE and the eNodeB. Here is merely an example. The method provided in this embodiment of the present invention is not limited to carrying the signaling indication only by using the foregoing signals.

Manner 1: If the resource block is configured by using the PDCCH, a specific scheduling solution may include the following cases.

Case 1: The allocation information that is sent by the PDCCH includes all information about determining the downlink transmission resource. A specific implementation may be as follows.

(1) The allocation information includes a time-frequency interval between the plurality of downlink transmission resources, a quantity of resource blocks corresponding to the plurality of downlink transmission resources, and a time-frequency location of a reference resource block in the resource blocks.

(2) The allocation information includes time-frequency locations of the plurality of downlink transmission resources.

Case 2: The allocation information includes a part of the information about determining the downlink transmission resource. An accurate location of the downlink transmission resource can be determined only by combining the allocation information and preset information. A manner of presetting the information may be that the terminal device and the network side device predefine the information by using a protocol, or the accurate location of the downlink transmission resource is determined when the terminal device accesses the network side device. The following further describes specific implementation in detail by using the protocol to predefine the formation, including the following.

(1) The protocol predefines location errors of a plurality of resources and the quantity of resource blocks, and numbers the plurality of various configurations. For example, a table shown in Table 1 is defined as follows.

TABLE 1

| Number | Time domain offset (unit/resource block) | Frequency domain offset (unit/resource block) | Quantity of resource blocks |
|---|---|---|---|
| 1 | +1 | +1 | 3 |
| 2 | −1 | −1 | 3 |
| 3 | +3 | 0 | 4 |
| ... | ... | ... | ... |
| N | −3 | +1 | 4 |

The allocation information includes the numbers of the configurations and the time-frequency location of the reference resource block in the resource blocks corresponding to the plurality of downlink transmission resources.

With reference to the specific value shown in Table 1, Manner 1 in Table 1 is selected for description as follows.

Figure 3:
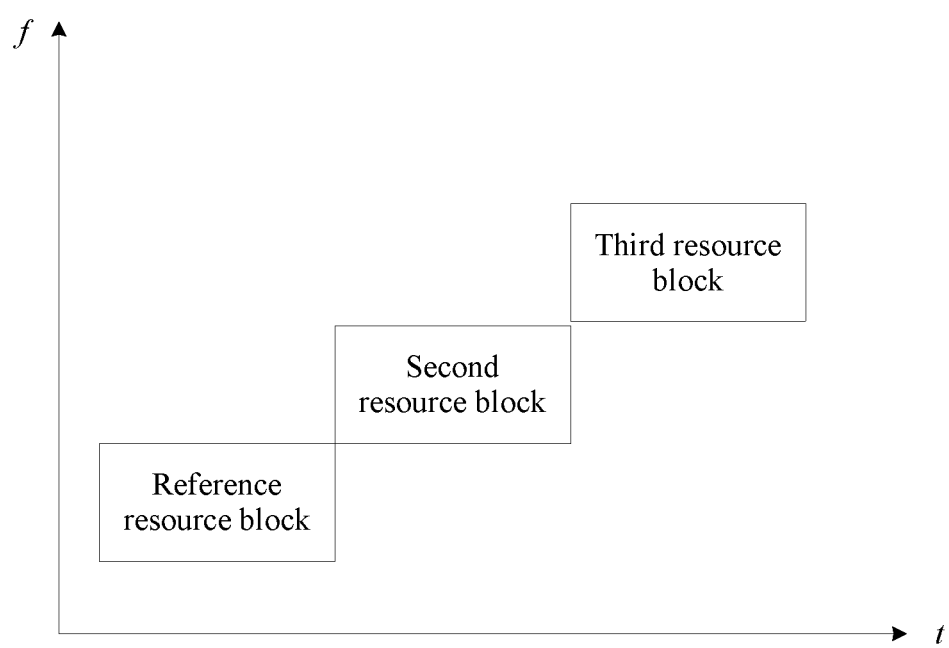
FIG. 3 is a schematic diagram of a relative relationship between resource blocks according to an embodiment of the present invention.

The downlink transmission resource is corresponding to three resource blocks. When a location of a reference resource block is determined, locations of the other two resource blocks in the three resource blocks are shown in FIG. 3. The second resource block is offset by one resource block unit based on the time domain and frequency domain of the reference resource block, and the third resource block is offset by one resource block unit based on the time domain and frequency domain of the second resource block. Certainly, a resource configuration parameter table in another manner may also be defined, and is not limited to the implementation of Table 1.

(2) The allocation information includes the time-frequency location of the reference resource block, and the protocol predefines the location error of the resource block and the quantity of resource blocks (that is, configures a fixed location error of the resource and the quantity of resource blocks).

(3) The allocation information includes the time-frequency location of the reference resource block and the quantity of resource blocks, and the protocol predefines the location error of the resource.

(4) The allocation information includes the time-frequency location of the reference resource block and the location error of the resource block, and the quantity of the resource blocks is predefined.

(5) The protocol predefines a number of each resource block and a number of each resource block group. For example, there are 10 available resource blocks as shown in FIG. 3 in a system bandwidth, and numbers of the 10 available resource blocks are 0-9, a number of a {0, 1} resource block group is 10, a number of a {0, 2} resource block group is 11, ..., a number of a {0, 2, 4} resource block group is n (n is a positive integer), and the corresponding allocation information includes the numbers of the resource block groups.

Manner 2: A part of resource configuration information may also be preconfigured by the RRC signaling, which is described in detail as follows.

(1) The protocol predefines the location errors of the plurality of resources and the quantity of resource blocks, and numbers the plurality of configurations, and then, based on definition of the protocol, the resource preconfiguration information that is sent by the network side device (which may be a base station) to the user by using the RRC signaling includes the numbers of the configurations, and the resource allocation information that is notified by the network side device to the user by using the PDCCH includes only a reference resource location.

(2) The resource preconfiguration information that is sent by the network side device to the user by using the RRC signaling includes the location error of the resource and the quantity of the resource blocks (in other words, the fixed location error of the resource and the quantity of the resource blocks are configured), and the resource allocation information that is notified by the network device to the user by using the PDCCH includes only the reference resource location.

(3) The resource preconfiguration information that is sent by the network side device to the user by using the RRC signaling includes the location error of the resource, and the resource allocation information that is notified by the network device to the user by using the PDCCH includes the reference resource location and the quantity of the resource blocks.

(4) The resource preconfiguration information that is sent by the network side device to the user by using RRC signaling includes the quantity of the resource blocks, and the resource allocation information that is notified by the network device to the user by using the PDCCH includes the reference resource location of the user and the location error of the resource.

(5) The protocol predefines the number of each resource block and the number of each resource block group, and the resource preconfiguration information that is sent by the network side device to the user by using the RRC signaling includes the number of the resource block group, so that the resource allocation information of the user does not need to be sent to the user.

When the terminal device is in an idle state, allocation information of the URLLC may be sent to the terminal device by using the paging.

Figure 4:
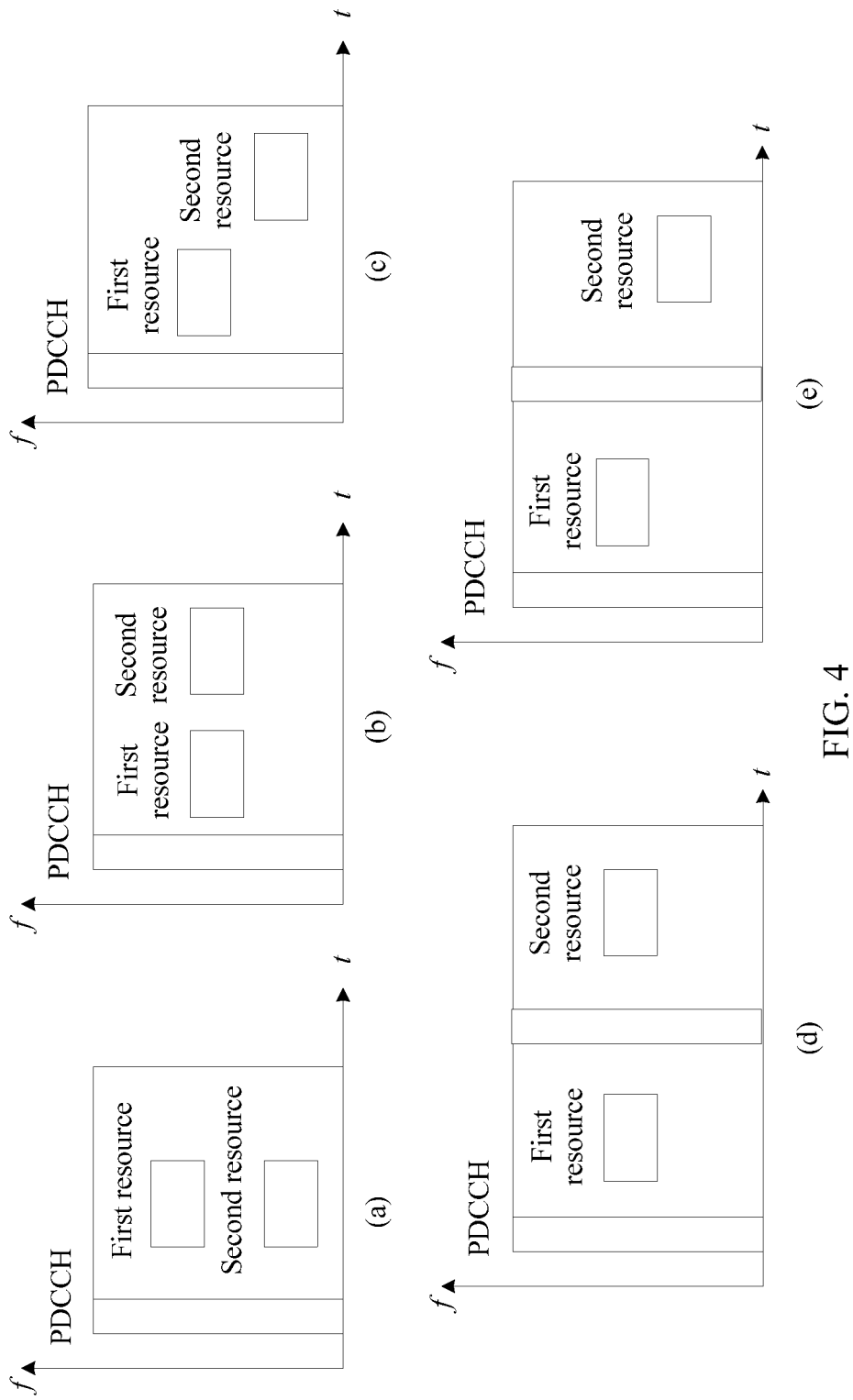
FIG. 4 is a schematic diagram of locations of a plurality of resource blocks for data transmission on a PDSCH in the prior art.

In an existing downlink transmitted subframe, a downlink control channel configured in LTE generally occupies first three OFDM symbols in a subframe, and occupies the entire system bandwidth, and remaining OFDM symbols of the subframe are occupied by a physical downlink shared channel (PDSCH) that carries user data and a reference signal, and the PDSCH carries the downlink data transmission. A plurality of resource blocks used to transmit data may be in a relationship of frequency division in (a) in FIG. 4 on the PDSCH, or may be in a relationship of time division in (b) in FIG. 4, or may be time-frequency resource blocks in (c) in FIG. 4, or may be a plurality of resource blocks that are scheduled in different subframes in (d) in FIG. 4 or in (e) in FIG. 4. In this embodiment of the present invention, scheduling signaling may be indicated in a first subframe, and no scheduling signaling needs to be indicated in a subsequent subframe. Another plurality of transmission resources may also be in a relationship of space division, in other words, different transmission antenna ports are used. The plurality of transmission resources may be indicated to the terminal by using signaling, and the terminal receives data on the specified plurality of resources based on the signaling indication and combines signal gains, thereby improving transmission bit error performance.

Embodiment 2

Figure 5:
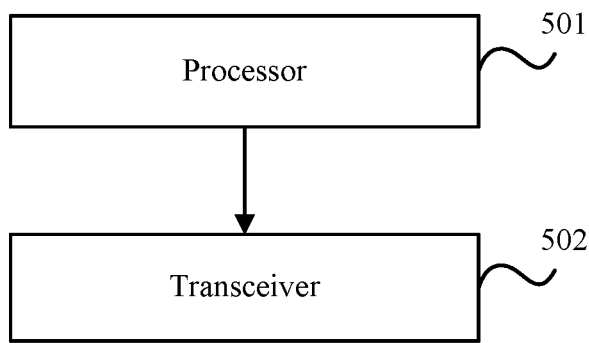
FIG. 5 is a schematic structural diagram of a network side device according to an embodiment of the present invention.

As shown in FIG. 5, an embodiment of the present invention provides a network side device, including a processor 501, configured to generate a signaling indication, where the signaling indication carries allocation information, and the allocation information is used to indicate a plurality of downlink transmission resources used to transmit data blocks, a transceiver 502, configured to send the signaling indication to a terminal device UE, so that the UE receives data on the specified plurality of downlink transmission resources based on the signaling indication.

Optionally, the processor 501 is further configured to obtain transmission capability information of the UE, and determine, based on the transmission capability information, whether to send the signaling indication to the UE, where the transmission capability information is used to indicate whether the UE supports ultra-reliable and low-latency communications URLLC transmission.

Optionally, the processor 501 is specifically configured to obtain the transmission capability information of the UE from a message that is sent by the UE in a random access process, or obtain the transmission capability information of the UE from RRC signaling.

Optionally, the processor 501 is configured to use a time division resource, a frequency division resource, or a space division resource as the downlink transmission resource.

Optionally, the transceiver 502 is configured to send the signaling indication to the UE by using one or a combination of a plurality of the following downlink signaling, including a physical downlink control channel (PDCCH), paging signaling, or the RRC signaling.

Optionally, the processor 501 is configured to add a time-frequency interval between the plurality of downlink transmission resources, a quantity of resource blocks corresponding to the plurality of downlink transmission resources, and a time-frequency location of a reference resource block in the resource blocks to the signaling indication as the allocation information.

Optionally, the processor 501 is configured to add time-frequency locations of the plurality of downlink transmission resources to the signaling indication as the allocation information.

Optionally, the processor 501 is configured to add the time-frequency location of the reference resource block in the resource blocks corresponding to the plurality of downlink transmission resources to the signaling indication as the allocation information, and the corresponding UE determines the downlink transmission resource based on the time-frequency location of the reference resource block, the preconfigured time-frequency interval between the downlink transmission resources, and the quantity of resource blocks.

Optionally, the processor 501 is further configured to predefine, with the UE, the time-frequency interval between the downlink transmission resources and the quantity of resource blocks by using a protocol, or determine the time-frequency interval between the downlink transmission resources and the quantity of resource blocks when the terminal device accesses the network side device.

In this embodiment, the plurality of downlink transmission resources are corresponding to a plurality of resource blocks that are formed through time division, frequency division, or space division. The data blocks that are transmitted on the plurality of resource blocks may be completely consistent, or may be different redundancy versions after channel coding is performed on a same data block, and version numbers of these different versions may be notified in real time or may be predetermined. The different redundancy versions do not need to include completely same content, on the contrary, the different redundancy versions will be a set of different coded bits, and each set of coded bits represents information bits of a same set. Because a redundancy version of the same data block may include an additional check bit that is not included in another redundancy version, the transceiver 502 is further configured to use the plurality of resource blocks to send different redundancy versions of the same data block to the UE, where sizes of the plurality of resource blocks may be different, and MCSs corresponding to the plurality of resource blocks may also be different.

Embodiment 3

Figure 6:
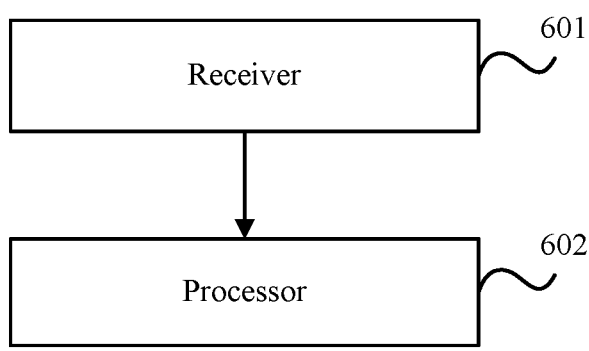
FIG. 6 is a schematic structural diagram of a terminal device according to an embodiment of the present invention.

As shown in FIG. 6, an embodiment of the present invention further provides a terminal device, including a receiver 601, configured to receive a signaling indication that is sent by a network side device, where the signaling indication carries allocation information, and the allocation information is used to indicate a plurality of downlink transmission resources used to transmit data blocks, a processor 602, configured to determine the plurality of downlink transmission resources based on the allocation information, and control the receiver to receive the data blocks on the plurality of downlink transmission resources.

Optionally, the terminal device further includes a transmitter, configured to send transmission capability information of the UE to the network side device, so that the network side device determines, based on the transmission capability information, whether to send the signaling indication to the UE, where the transmission capability information is used to indicate whether the UE supports ultra-reliable and low-latency communications URLLC transmission.

Optionally, the transmitter is specifically configured to carry the transmission capability information in a message that is sent in a random access process, or carry the transmission capability information in RRC signaling.

Optionally, the receiver 601 receives the data blocks on the plurality of downlink transmission resources that include a time division resource, a frequency division resource, or a space division resource.

Optionally, the receiver 601 is specifically configured to receive the signaling indication from the following downlink signaling, including a physical downlink control channel (PDCCH), paging signaling, or the RRC signaling.

Optionally, the processor 602 is specifically configured to determine the plurality of downlink transmission resources based on a time-frequency interval between the plurality of downlink transmission resources, a quantity of resource blocks corresponding to the plurality of downlink transmission resources, and a time-frequency location of a reference resource block in the resource blocks that are in the allocation information.

Optionally, the processor 602 is specifically configured to determine the plurality of downlink transmission resources based on time-frequency locations of the plurality of downlink transmission resources in the allocation information.

Optionally, the processor 602 is specifically configured to determine the plurality of downlink transmission resources based on the time-frequency location of the reference resource block in the resource blocks corresponding to the plurality of downlink transmission resource, the preconfigured time-frequency interval between the downlink transmission resources, and the quantity of resource blocks that are in the allocation information.

Optionally, the processor 602 is further configured to predefine, with the network side device, the time-frequency interval between the downlink transmission resources and the quantity of resource blocks by using a protocol, or determine the time-frequency interval between the downlink transmission resources and the quantity of resource blocks when the terminal device connects to the network side device.

Optionally, the receiver 601 is further configured to receive, in the plurality of resource blocks, different redundancy versions that are sent by the network side device and that is obtained after channel coding is performed on a same data block, and version numbers of these different versions may be notified in real time, or may be predetermined. Sizes of the plurality of resource blocks may be different, and MCSs corresponding to the plurality of resource blocks may also be different.

Technical solutions provided in the foregoing embodiments of this application include at least the following technical effects or advantages.

According to the downlink transmission method and an apparatus provided in the embodiments of the present invention, when downlink data is transmitted, a plurality of transmission resources are specified to transmit the data blocks at the same time, and the plurality of transmission resources may be in a relationship of time division, frequency division, or space division. The plurality of transmission resources are indicated to the terminal device by using the signaling indication, the terminal device receives the data blocks on the specified plurality of transmission resources based on the signaling indication, and after receiving the data blocks, the terminal device may combine signal gains, thereby improving transmission bit error performance.

A person skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Specifically, a computer program instruction corresponding to the downlink transmission method in the embodiments of the present invention may be stored in a storage medium such as an optical disk, a hard disk, or a USB flash drive. When a computer program instruction corresponding to an information processing method in the storage medium is read or executed by an electronic device, the following step is performed.

The network side device sends the signaling indication to the terminal device UE, so that the UE receives data on the specified plurality of downlink transmission resources based on the signaling indication, where the signaling indication carries the allocation information, and the allocation information is used to indicate the plurality of downlink transmission resources used to transmit the data blocks.

Although some preferred embodiments of this application have been described, a person skilled in the art can make changes and modifications to these embodiments once they learn the basic inventive concept. Therefore, the following claims are intended to be construed as to cover the preferred embodiments and all changes and modifications falling within the scope of this application.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

The invention claimed is:

1. A downlink transmission method, comprising:
  receiving, from a terminal device (UE), at least transmission capability information of the UE, wherein the transmission capability information indicates whether the UE supports ultra-reliable and low-latency communications (URLLC) transmission;
  determining and sending, according to the transmission capability information of the UE, a signaling indication to the UE;
  wherein the signaling indication comprises allocation information, wherein the allocation information indicates downlink transmission resources comprising a plurality of resource blocks formed in a relationship for transmission of data blocks, of at least one of time division, frequency division, or space division, and wherein the signaling indication further comprises modulation and coding scheme (MCS) information of a dedicated MCS for the URLLC transmission.

2. The method according to claim 1, wherein the receiving the transmission capability information of the UE comprises:
  obtaining, by a network side device, the transmission capability information of the UE from at least one of or radio resource control (RRC) signaling or a message that is sent by the UE in a random access process.

3. The method according to claim 1, wherein the dedicated MCS is pre-defined by using a protocol.

4. The method according to claim 1, wherein the MCS information is a number of the dedicated MCS.

5. The method according to claim 1, wherein the allocation information indicates a number of a resource block group corresponding to the plurality of resource blocks.

6. The method according to claim 1, wherein the allocation information is sent by using paging in response to the terminal device being in an idle state.

7. The method according to claim 1, wherein the plurality of the resource blocks is used to transmit different redundancy versions of a same data block.

8. The method according to claim 1, wherein resource blocks of the plurality of the resource blocks corresponds to different dedicated MCSs.

9. A downlink data receiving method, comprising:
  sending, from a terminal device (UE), at least transmission capability information of the UE, wherein the transmission capability information indicates whether the UE supports ultra-reliable and low-latency communications (URLLC) transmission;
  receiving, by the UE, a signaling indication sent by a network side device, wherein the signaling indication comprises allocation information, wherein the allocation information indicates downlink transmission resources for transmission of data blocks, the downlink transmission resources comprising a plurality of resource blocks formed in a relationship of at least one of time division, frequency division, or space division, and wherein the signaling indication further comprises modulation and coding scheme (MCS) information of a dedicated MCS for the URLLC transmission.

10. The method according to claim 9, wherein the sending, by the UE, transmission capability information of the UE to the network side device comprises:
  sending, by the UE, the transmission capability information in at least one of radio resource control (RRC) signaling or a message in a random access process.

11. The method according to claim 9, wherein the dedicated MCS is pre-defined by using a protocol.

12. The method according to claim 9, wherein the MCS information is a number of the dedicated MCS.

13. The method according to claim 9, wherein the allocation information indicates a number of a resource block group corresponding to the plurality of resource blocks.

14. The method according to claim 9, wherein the allocation information is received by using paging in response to the UE being in an idle state.

15. The method according to claim 9, wherein the plurality of the resource blocks is used to receive different redundancy versions of a same data block.

16. The method according to claim 9, wherein resource blocks of the plurality of the resource blocks corresponds to different dedicated MCSs.

17. A terminal device, comprising:
  at least one processor; and
  at least one non-transitory computer-readable storage medium storing a program to be executed by the at least one processor, the program including instructions to:
    send at least transmission capability information, wherein the transmission capability information indicates whether the terminal device supports ultra-reliable and low-latency communications (URLLC) transmission;
    receive a signaling indication sent by a network side device, wherein the signaling indication comprises allocation information, wherein the allocation information indicates downlink transmission resources for transmission of data blocks and comprising a plurality of resource blocks formed in a relationship of at least one of time division, frequency division, or space division, and wherein the signaling indication further comprises modulation and coding scheme (MCS) information of a dedicated MCS for the URLLC transmission.

18. The terminal device according to claim 17, wherein the instructions to send transmission capability information to the network side device include instructions to:
send the transmission capability information in at least one of radio resource control (RRC) signaling or a message in a random access process or.

19. The terminal device according to claim 17, wherein the dedicated MCS is pre-defined by using a protocol.

20. The terminal device according to claim 17, wherein the MCS information is a number of the dedicated MCS.

* * * * *

UNITED STATES PATENT AND TRADEMARK OFFICE
CERTIFICATE OF CORRECTION

PATENT NO. : 11,736,935 B2  
APPLICATION NO. : 17/513603  
DATED : August 22, 2023  
INVENTOR(S) : Liu et al.

Page 1 of 1

It is certified that error appears in the above-identified patent and that said Letters Patent is hereby corrected as shown below:

In the Claims

In Column 17, in Claim 18, Line 11, delete "process or." and insert -- process. --.

Signed and Sealed this  
Twenty-fourth Day of October, 2023

Katherine Kelly Vidal  
*Director of the United States Patent and Trademark Office*